United States Patent
Kawamura

(10) Patent No.: US 6,360,287 B1
(45) Date of Patent: Mar. 19, 2002

(54) METHOD AND APPARATUS FOR ASYNCHRONOUS COMMUNICATION OVER A STANDARD DATA BUS USING A PLURALITY OF DATA DESCRIPTORS HAVING STILL IMAGE DATA WRITTEN THEREIN

(75) Inventor: Harumi Kawamura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/204,297

(22) Filed: Dec. 3, 1998

(30) Foreign Application Priority Data

Dec. 10, 1997 (JP) .......................... P09-339576

(51) Int. Cl.$^7$ ............................... G06F 13/00
(52) U.S. Cl. ............... 710/61; 710/20; 710/33; 370/412
(58) Field of Search ............... 710/1, 20, 36, 710/52, 100, 61, 33, 60, 122; 370/258, 412; 711/100, 101

(56) References Cited

U.S. PATENT DOCUMENTS

| | | | | |
|---|---|---|---|---|
| 5,121,113 A | * | 6/1992 | Kedge et al. | 340/712 |
| 5,544,324 A | * | 8/1996 | Edem et al. | 709/200 |
| 5,594,734 A | * | 1/1997 | Worseley et al. | 370/395 |
| 5,640,392 A | * | 6/1997 | Hayashi | 370/395 |
| 5,673,394 A | * | 9/1997 | Fenwick et al. | 395/200.08 |
| 5,991,520 A | * | 11/1999 | Smyers et al. | 710/100 |
| 6,064,676 A | * | 5/2000 | Slattery et al. | 370/412 |
| 6,101,613 A | * | 8/2000 | Garney et al. | 713/600 |

FOREIGN PATENT DOCUMENTS

| | | |
|---|---|---|
| EP | 0696853 | 2/1996 |
| WO | 9602876 | 2/1996 |
| WO | 9728504 | 8/1997 |

OTHER PUBLICATIONS

*The IEEE–1394 High Speed Serial Bus*, Bloks, R.H.J., Philips Journal of Research, vol. 50, No. 1, 1996, pp. 209–216.

* cited by examiner

Primary Examiner—Thomas Lee
Assistant Examiner—RiJue Mai
(74) Attorney, Agent, or Firm—Jay H. Maioli

(57) ABSTRACT

Data having a small amount of data, such as still image data, is transmitted by using asynchronous packets. A source apparatus writes data which can be selected from a data source block into a data descriptor within a memory. Then, the source apparatus transmits the data read from the data descriptor to a receiver apparatus by using asynchronous packets. The receiver apparatus can also write data which can be selected from the data source block into a data descriptor within a memory.

15 Claims, 11 Drawing Sheets

FIG. 3

| address | contents |
|---|---|
| 00 00 00 | descriptor_length (FF) |
| 00 00 01 | (FF) |
| 00 00 02 | list_type (Data Descriptor) |
| 00 00 03 | status |
| 00 00 04 | reserved |
| 00 00 05 | descriptor_length |
| 00 00 06 | |
| 00 00 07 | |
| 00 00 08 | data |
| : | |
| : | |
| : | |
| : | |
| : | |
| 00 FF FF | |
| 01 00 00 | |
| : | |
| : | |
| FF FF FF | |

A : 64K BYTES
B : 16M BYTES

FIG. 4

| opcode | READ DESCRIPTOR |
|---|---|
| operand [0] | descriptor_identifier |
| operand [1] | |
| operand [2] | |
| operand [3] | read_result_status |
| operand [4] | data_length (FF) |
| operand [5] | (FF) |
| operand [6] | address (FF) |
| operand [7] | (FF) |
| operand [8] | data_length for Data Descriptor |
| operand [9] | |
| operand [10] | |
| operand [11] | address for Data Descriptor |
| operand [12] | |
| operand [13] | |

FIG. 5

| opcode | READ DESCRIPTOR |
|---|---|
| operand [0] | descriptor_identifier |
| operand [1] | |
| operand [2] | |
| operand [3] | subfunction |
| operand [4] | data_length (FF) |
| operand [5] | (FF) |
| operand [6] | address (FF) |
| operand [7] | (FF) |
| operand [8] | data_length for Data Descriptor |
| operand [9] | |
| operand [10] | |
| operand [11] | address for Data Descriptor |
| operand [12] | |
| operand [13] | |
| operand [14] | data |
| ⋮ | |

FIG. 6A

| opcode | DATA DESCRIPTOR STATUS |
|---|---|
| operand [0] | FF |

FIG. 6B

| opcode | DATA DESCRIPTOR STATUS |
|---|---|
| operand [0] | status (stable/busy) |

| address | contents |
|---|---|
| 00 00 | descriptor_length |
| 00 01 | |
| 00 02 | list_type |
| 00 03 | attributes |
| 00 04 | list_specific_information |
| ⋮ | |
| ⋮ | |
| ⋮ | number_of_entries(n) |
| ⋮ | |
| ⋮ | object_entry [0] |
| ⋮ | |
| ⋮ | |
| ⋮ | ⋮ |
| ⋮ | object_entry [n-1] |
| ⋮ | |
| ⋮ | |

METHOD AND APPARATUS FOR ASYNCHRONOUS COMMUNICATION OVER A STANDARD DATA BUS USING A PLURALITY OF DATA DESCRIPTORS HAVING STILL IMAGE DATA WRITTEN THEREIN

BACKGROUND OF THE INVENTION

1. Field of the Invention

The present invention relates to a system, in which a plurality of electronic apparatuses are connected by a bus, such as the IEEE1394 serial bus, capable of transmitting isochronous packets and asynchronous packets, which perform communications among those electronic apparatuses. More particularly, the present invention relates to technology that efficiently transmits data having a small amount of data, such as still image data, text data, icon bit map data, and the like.

2. Description of the Related Art

A system has been conceived in which electronic apparatuses (hereinafter referred to as apparatuses), such as a digital video cassette recorder, a television receiver, or a personal computer, are connected by the IEEE1394 serial bus (hereinafter referred to as a 1394 bus), and information signals, such as video data or audio data, and control signals, such as an operation control command or a connection control command of the apparatus, are communicated among these apparatuses.

In a system in which a plurality of apparatuses are connected by a 1394 bus, transmission of packets is performed by time-division multiplexing at every predetermined communication cycle (for example, 125 μsec). This packet transmission is started when an apparatus called a cycle master sends a cycle start packet indicating the start of a communication cycle onto the 1394 bus. For communications in one communication cycle, there are two types of communications of isochronous (hereinafter referred to as Iso) communication in which information signals, such as video data or audio data, are transmitted in real time and asynchronous (hereinafter referred to as Async) communication in which a control signal, such as an operation control command or a connection control command of the apparatus, is transmitted at non-fixed intervals as required. The Iso packet is transmitted earlier than the Async packet. Attaching a channel number to each of the Iso packets makes it possible to distinguish among a plurality of Iso data. After transmission of all the Iso packets to be transmitted is completed, the period to the next cycle start packet is used for the transmission of Async packets.

In a system such as that described above, in which a plurality of apparatuses are connected by the 1394 bus, it has been proposed that information signals be handled by an audio-video/control (AV/C) descriptor model (Japanese Patent Application No. 9-96874 (corresponding U.S. Pat. No. 054,183 filed on Apr. 2, 1998), Japanese Patent Application No. 9-177917). More specifically, for example, contents, such as a service list of a digital tuner or a track list of a disk player, which can be selected from a data source, are held in the form of an object list in a memory within an apparatus by using an object having the structure shown in FIG. 13. When a desired object is specified from the object list, the data stream of the object is output from the apparatus by using the Iso packets.

Transmission of still data, such as still image data, text data, or icon bit map data, among apparatuses connected by the 1394 bus, has been conceived. Of course, it is possible to hold the list of these data inside the apparatus as the above-described object list and to transmit the selected data by using Iso packets. However, unlike data, such as audio data or video data, that requires a synchronization signal, these data have a small amount of data and no merits of transmitting in Iso communication. However, a scheme in which such data are transmitted by using Async communication among audio-video (AV) apparatuses has not been conceived.

SUMMARY OF THE INVENTION

The present invention, which has been achieved in view of such problems, provides means for transmitting data having a small amount of data, such as the above-mentioned still data, in Async communication.

An apparatus of the present invention is an apparatus for use in a system which performs communications among a plurality of electronic apparatuses that are connected by a bus capable of performing Iso and Async communications, wherein the apparatus comprises a data descriptor into which data for an object of Async communication is written.

A data communication method of the present invention is a method which performs communications among a plurality of electronic apparatuses that are connected by a bus capable of performing Iso and Async communications, the data communication method comprising the steps of: writing data which can be selected from a data source inside an electronic apparatus on the transmission side into a data descriptor; and transmitting the data read from the data descriptor in Async communication.

A data communication method of the present invention is a method which performs communications among a plurality of electronic apparatuses that are connected by a bus capable of performing Iso and Async communications, the data communication method comprising the step of: transmitting in Async communication data of contents which can be selected from a data source inside an electronic apparatus on the transmission side into a data descriptor inside an electronic apparatus on the receiving side.

According to the present invention, the electronic apparatus on the transmission side writes data which can be selected from a data source inside the apparatus into a data descriptor, and transmits the data read from the data descriptor in Async communication.

According to the present invention, the electronic apparatus on the transmission side transmits data of contents which can be selected from a data source inside the apparatus on the transmission side in Async communication.

The above and further objects, aspects and novel features of the invention will become more apparent from the following detailed description when read in connection with the accompanying drawings.

BRIEF DESCRIPTION OF THE DRAWINGS

FIG. 3 shows an example of the structure of a data descriptor which is newly proposed herein.

FIG. 4 shows an example of the structure of a descriptor read command.

FIG. 5 shows an example of the structure of a descriptor write command.

FIGS. 6A and 6B show an example of the structure of a command/response for notifying a change of the status of a data descriptor.

DESCRIPTION OF THE PREFERRED EMBODIMENT

The embodiment of the present invention will be described below in detail with reference to the accompanying drawings.

Figure 1:
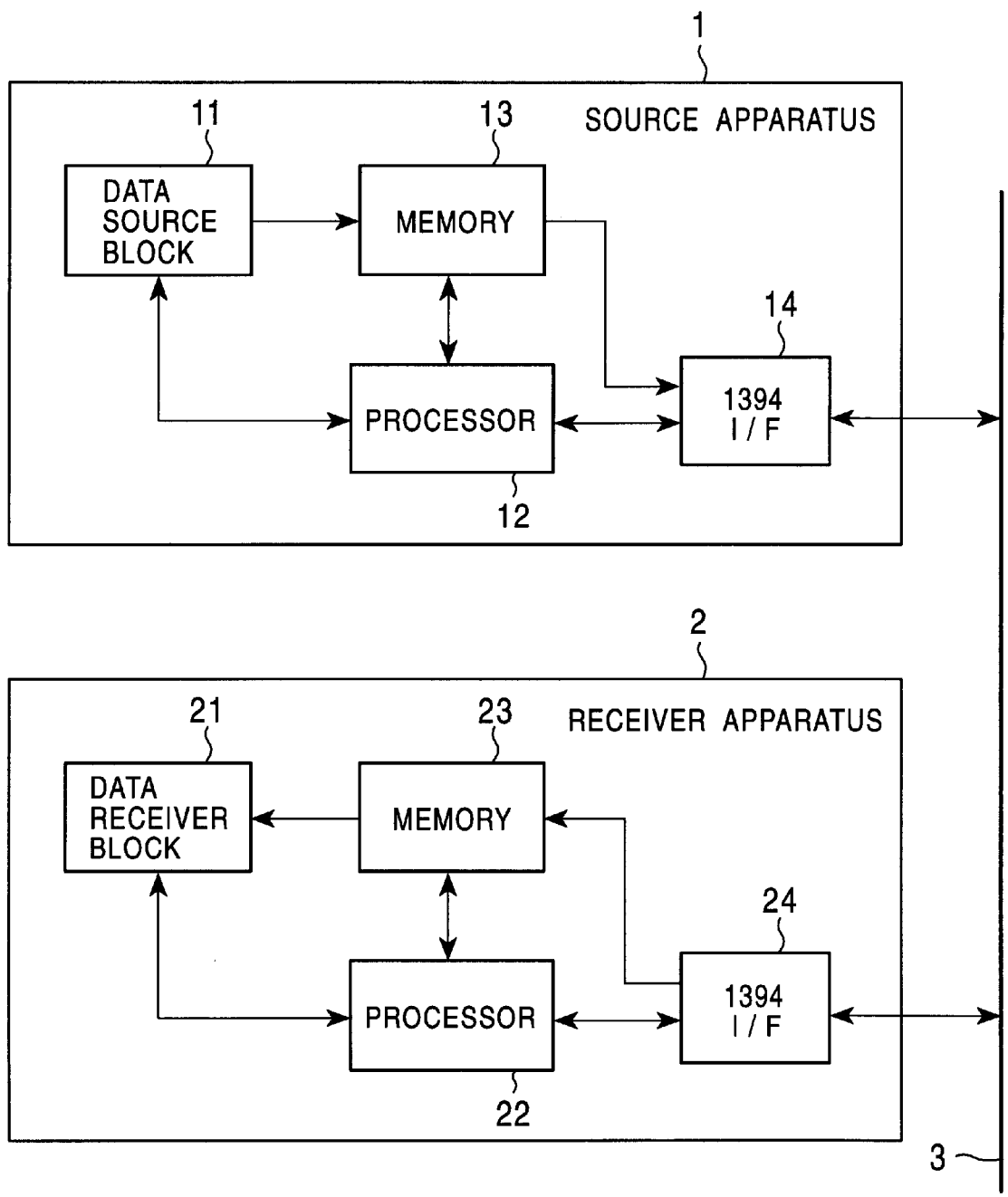
FIG. 1 is a diagram showing the construction of a communication system of the present invention.

FIG. 1 is a block diagram showing the construction of a communication system of the present invention. In this communication system, a source apparatus 1 and a receiver apparatus 2 are connected by a bus 3 so that still data, such as still image data, text data, or icon bit map data can be transmitted from the source apparatus 1 to the receiver apparatus 2.

The source apparatus 1 comprises therein a data source block 11, a processor 12, a memory 13, and a 1394 interface 14. The data source block 11 generates the above-mentioned still data (in the following description, still image data is shown as an example). The processor 12 performs control of the entire source apparatus 1. The memory 13 is formed of a RAM or the like in which an area for writing still image data generated by the data source block 11, the attribute data thereof, and the like is provided. The 1394 interface 14 causes still image data read by the processor 12 from the descriptor of the memory 13, various commands/responses created by the processor 12, and the like to be stored in Async packets and sent to the 1394 bus 3. Although, in FIG. 1, the still image data output from the memory 13 is directly input to the 1394 interface 14, it may be input to the 1394 interface 14 via the processor 12. Furthermore, the 1394 interface 14 extracts various commands/responses and the like from the Async packets sent to the 1394 bus 3 by the receiver apparatus 2 and sends them to the processor 12.

Similarly, the receiver apparatus 2 comprises therein a data receiver block 21, a processor 22, and a 1394 interface 24. The 1394 interface 24 receives Async packets sent by the source apparatus 1 to the 1394 bus 3, and separates them into still image data and various commands/responses, and they are written into the memory 23 under the control of the processor 22. Or, the processor 22 writes still image data received from the 1394 interface 24 into a memory 23. Also, the processor 22 analyzes the various commands/responses and performs a process corresponding to it. Furthermore, the processor 22 performs control of the entire receiver apparatus 2. The memory 23 is formed of a RAM or the like. The data receiver block 21 receives still image data within the memory 23 under the control of the processor 22.

Although, in actuality, input means (a keyboard, a remote commander, etc.) for inputting various commands by a user, display means, and the like are provided, these have been omitted here.

Figure 2:
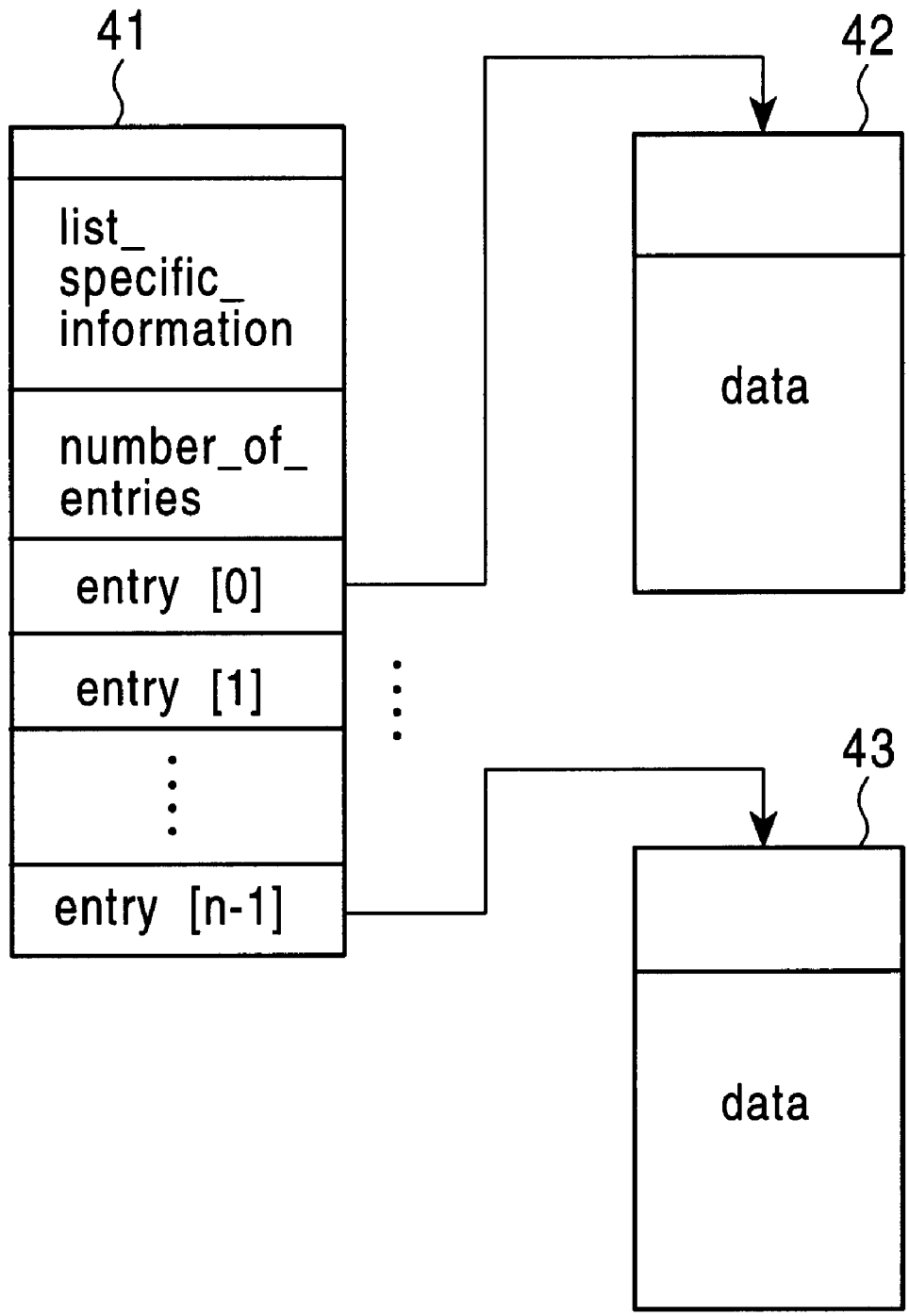
FIG. 2 shows an example of the structure of a contents list and a data descriptor provided within a memory 13 of FIG. 1.
Figures 12, 13:
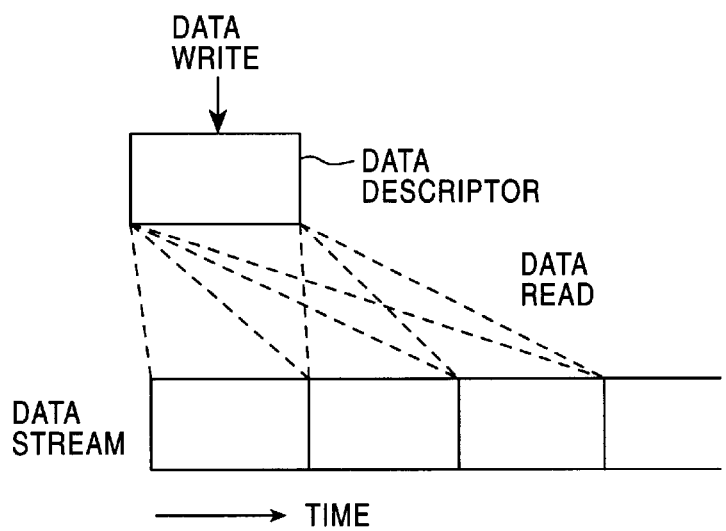
FIG. 12 shows an example of processing of data written into a data descriptor inside the receiver apparatus.
FIG. 13 shows the structure of an object list.

FIG. 2 shows an example of the structure of the contents list and the data descriptor provided within the memory 13. The basic structure of a contents list 41 is shown in FIG. 13. Here, the list type of address "0002" is "still image". The number of entries (number_of_entries) is "n". Each entry (entry) is created in such a manner as to correspond to one still image. Here, since n still images are entered, the data source block 11 generates n still images. The list ID of a child list (Child List) of the entry and the attributes of the still image of the entry and the like are written into each entry. In FIG. 2, a data descriptor (Data_Descriptor) 42, which is a child list of entry [0], and a data descriptor 43, which is a child list of entry [n−1], are shown in the figure.

FIG. 3 shows an example of the structure of a data descriptor which has been newly proposed herein. In the AV/C object list model, it is possible to have an object list (object_list), which is a list of the information related to the object as a hierarchy below an object entry (object_entry). Therefore, the data descriptor is similar to the object list in that it has a list ID (list_ID). However, although the list of the contents which can be selected is stored in the object list, the contents (here the still image data) themselves are stored in the data descriptor. Also, the field of the descriptor length (descriptor_length) is 3 bytes long, and data up to 16M bytes can be handled. Furthermore, in order to be compatible with a conventional object list and to be capable of being used as a new descriptor, a value to be stored in the fields (addresses "00 00 00" and "00 00 01") corresponding to the descriptor length field in the conventional object list is "FFFF", a list type (stored at address "00 00 02") is a data descriptor, and the fields after that are newly defined.

The status (status) of address "00 00 03" represents the status (valid/invalid, stable/busy, etc.) of data stored in the data descriptor. A descriptor length of the data descriptor is stored in three bytes of addresses "00 00 05" to "00 00 07". Further, at address "00 00 08" and thereafter, data (here, still image data) is stored.

In order for another apparatus connected to the 1394 bus to read the contents of the descriptor provided within the apparatus connected to the 1394 bus, a descriptor read (READ DESCRIPTOR) command is used. Therefore, in order for the receiver apparatus 2 in FIG. 1 to read the contents of the contents list 41 and the data descriptors 42 and 43 created within the memory 13 inside the source apparatus 1, the receiver apparatus 2 must send a descriptor read command to the source apparatus 1 through the 1394 bus 3. Upon receiving this descriptor read command, the source apparatus 1 reads the contents of the descriptor from the memory 13 and returns them as a response to the receiver apparatus 2. In a similar manner, in order for another apparatus to write into the descriptor, a descriptor write (WRITE DESCRIPTOR) command is used.

FIG. 4 shows an example of the structure of a descriptor read command. This descriptor read command is newly proposed to make it possible to read the data descriptor shown in FIG. 3. That is, the data length of two bytes stored in operands [4] and [5] is "FFFF", and the read address of two bytes stored in operands [6] and [7] is "FFFF". Further, three bytes of operands [8] to [10] represent the length of a data descriptor to be read, and the three bytes of operands [11] to [13] represent the read address of the data descriptor.

In a similar manner, FIG. 5 shows an example of the structure of a descriptor write command. In the descriptor write command, data to be written is stored in operand [14] and thereafter.

The use of the descriptor read command or the descriptor write command makes it possible to access the area of 16 M bytes shown at B of FIG. 3 (the conventional descriptor read command or descriptor write command can access only the area of 64K bytes shown at A of FIG. 3). In a case in which the data within the descriptor is rewritten inside the source apparatus 1 while the receiver apparatus 2 of FIG. 1 is reading the data descriptor in the source apparatus 1 of FIG. 1, the read data is not guaranteed. Therefore, the processor 12 of the source apparatus 1 writes beforehand information (stable/busy, etc.) indicating the state of the data within the data descriptor in the status field of address "00 00 03" of the data descriptor. The receiver apparatus 2 sends beforehand to the source apparatus 1 a notify (NOTIFY) command which is a command for informing that the data descriptor has changed. The operation code and the operand of the notify command used at this time are shown in FIG. 6A. Also, the operation code and the operand of the response which are returned from the source apparatus 1 to the receiver apparatus 2 are shown in FIG. 6B.

Figure 7:
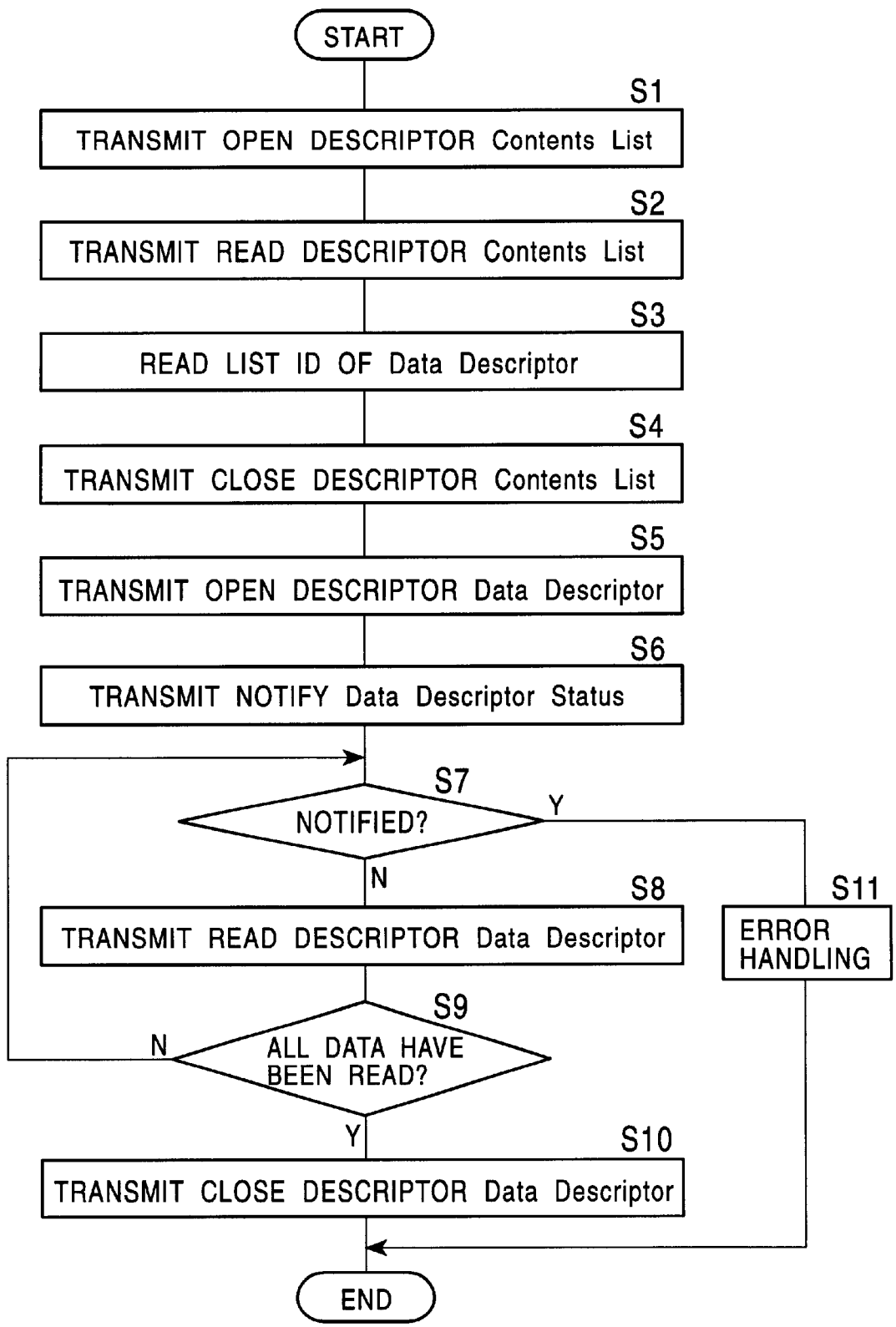
FIG. 7 shows an operation when a receiver apparatus reads still image data within a descriptor inside a source apparatus in the communication system shown in FIG. 1.

Next, referring to FIG. 7, a description will be given of an operation when the receiver apparatus 2 reads still image data from the data descriptor inside the source apparatus 1 in the communication system shown in FIG. 1. In the flowchart of FIG. 7 and those that follow, a response is of course returned with respect to the transmitted command, but the contents of the response are not described excluding a particularly required case.

Initially, the receiver apparatus 2 transmits to the source apparatus 1 a command (OPEN DESCRIPTOR Contents List) for opening the contents list 41 (step S1). The receiver apparatus 2 may then access the contents list 41.

Next, the receiver apparatus 2 transmits to the source apparatus 1 a command (READ DESCRIPTOR Contents List) for reading the contents list 41 (step S2). Upon receiving this command, the source apparatus 1 reads the contents list 41 from the memory 13, stores it in the response, and returns it to the receiver apparatus 2.

Next, the receiver apparatus 2 reads the list ID of the data descriptor from the entry of the contents list stored in the response (step S3). Then, the list ID of the data descriptor in which the still image data desired to be received has been written is stored beforehand in the memory 23.

Next, the receiver apparatus 2 transmits a command (CLOSE DESCRIPTOR Contents List) for closing the contents list 41 to the source apparatus 1 (step S4).

Next, the receiver apparatus 2 transmits to the source apparatus 1 a command (OPEN DESCRIPTOR Data Descriptor) for opening the data descriptor (here a data descriptor 42) in which a still image desired to be received has been written (step S5). The receiver apparatus 2 may then access the data descriptor 42.

Furthermore, the receiver apparatus 2 transmits to the source apparatus 1 a command (NOTIFY Data Descriptor Status) for notifying an occurrence of the change of the contents of the data descriptor 42 (step S6).

Next, the receiver apparatus 2 determines whether or not there has been a response of the notification of the occurrence of the change of the contents of the data descriptor 42 from the source apparatus 1 (step S7). When there has been such response, since the data within the data descriptor 42 cannot be guaranteed, after error handling is performed (step S11), the processing is terminated.

When there is no notification in step S7, the receiver apparatus 2 transmits a command (READ DESCRIPTOR Data Descriptor) for reading the data descriptor 42 to the source apparatus 1 (step S8). Upon receiving this command, the source apparatus 1 reads still image data from the data descriptor 42, stores it in the response, and returns it to the receiver apparatus 2.

Next, the receiver apparatus 2 determines whether or not the reading of all the still image data within the data descriptor 42 has been completed. If the reading has not been completed, the process, starting from step S7, is repeated. The details of the process of step S9 will be described later.

When it is determined in step S9 that the reading of all the still image data within the data descriptor 42 has been completed, after a command (CLOSE DESCRIPTOR Data Descriptor) for closing the data descriptor 42 is transmitted to the source apparatus 1 (step S10), the processing is terminated.

Figure 8:
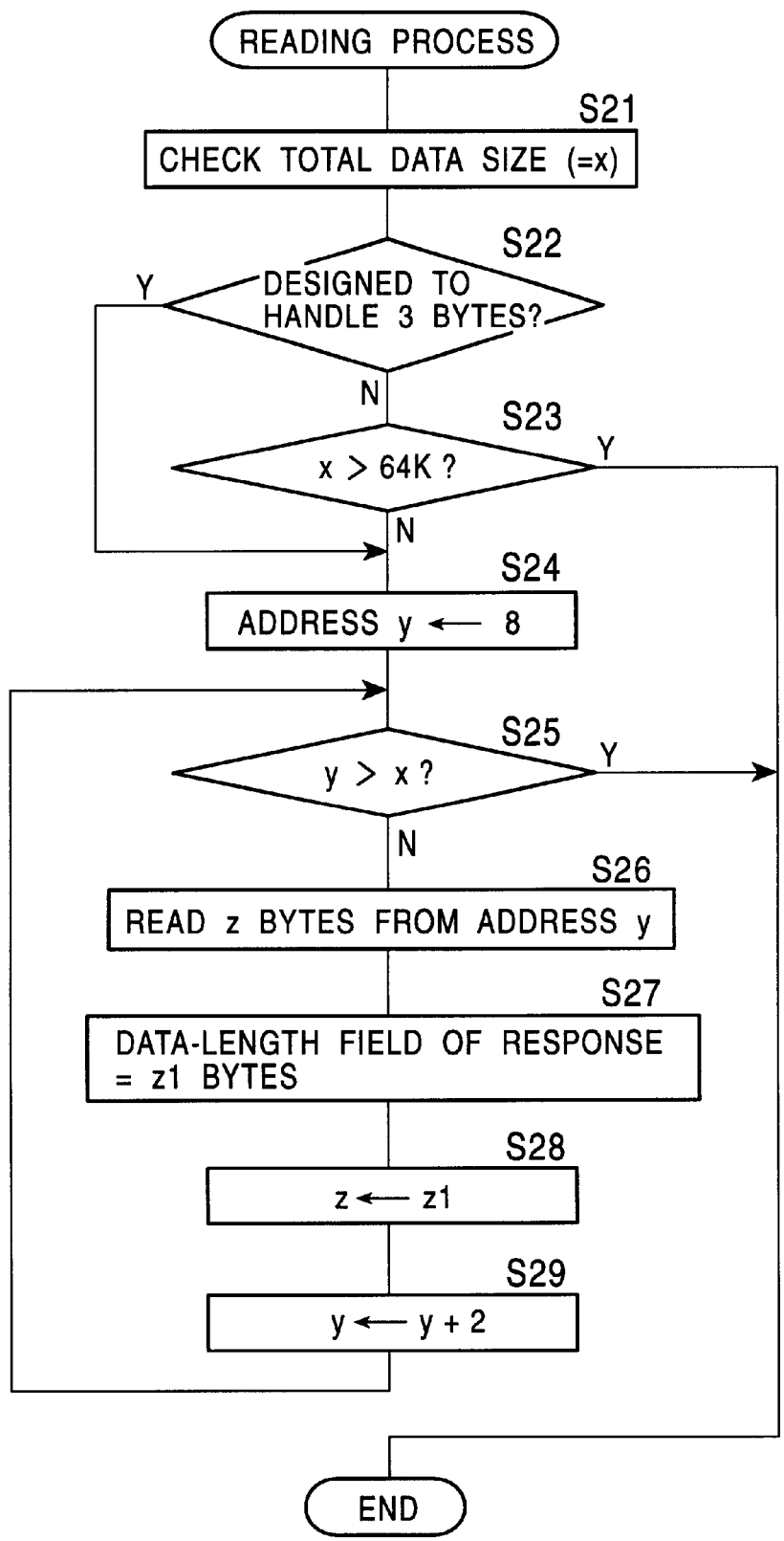
FIG. 8 is a flowchart showing the details of the process for reading the contents of the data descriptor in FIG. 7.

FIG. 8 is a flowchart showing the details of the process for reading the contents of the data descriptor in FIG. 7.

Initially, the descriptor length of three bytes stored at addresses "00 00 05" to "00 00 07" of the data descriptor is seen, and the total data size is checked (step S21). Here, the total data size is assumed to be x bytes.

Next, a determination is made as to whether or not the receiver apparatus 2 itself is designed to handle three bytes, that is, whether or not the receiver apparatus 2 is designed to handle the data descriptor shown in FIG. 3 (step S22). Determination of whether the receiver apparatus 2 is so designed is made by, for example, reading the information prestored in the ROM (not shown) inside the receiver apparatus 2 by the processor 22.

When it is determined in step S22 that the receiver apparatus 2 is designed to handle three bytes, then the read address y is set to "00 00 08" (step S24), and the comparison of magnitude of y and x is made (step S25). When y is equal to or smaller than x, z bytes are read from address y. That is, the receiver apparatus 2 sets the data length of operands [8] to [10] of the descriptor read command shown in FIG. 4 to z bytes and sets the address of operands [11] to [13] to y, and transmits them to the source apparatus 1.

Upon receiving this command, the source apparatus 1 stores the data of z1 bytes (z1≦z) in the response and sends it to the receiver apparatus 2. Since the length of the data-length field of the response is z1 bytes (step S27), next, the receiver apparatus 2 sets z=z1 (step S28), and further, increments y to y+z (step S29), and the process returns to step S25. That is, when the data of the size specified by the receiver apparatus 2 cannot be transmitted by the source apparatus 1, the source apparatus 1 transmits data of a size which can be transmitted, and the receiver apparatus 2 requests data of a size that the source apparatus 1 can transmit from the next time.

The process of steps S25 to S29 is repeated. When y>x is reached (YES in step S25), it is determined that all the data have been read, and the process is terminated.

When it is determined in step S22 that the receiver apparatus 2 is not designed to handle three bytes, a determination is made as to whether or not the total data size x is greater than 64K bytes (step S23). If it is equal to or smaller than 64K bytes, reading is possible, and therefore, the process proceeds to step S24. When the total data size is greater than 64K bytes, reading is not possible, and therefore, the process is terminated.

The above description is an example in which data descriptors are created for all the entries in the contents list 41 within the memory 13. Next, referring to FIG. 9, a description will be given of a process when only the data descriptor of the entry selected by the receiver apparatus 2 is created as a child list of the contents list 41. The processes in FIG. 9 which correspond to those in FIG. 7 are given the same step numbers.

Figure 9:
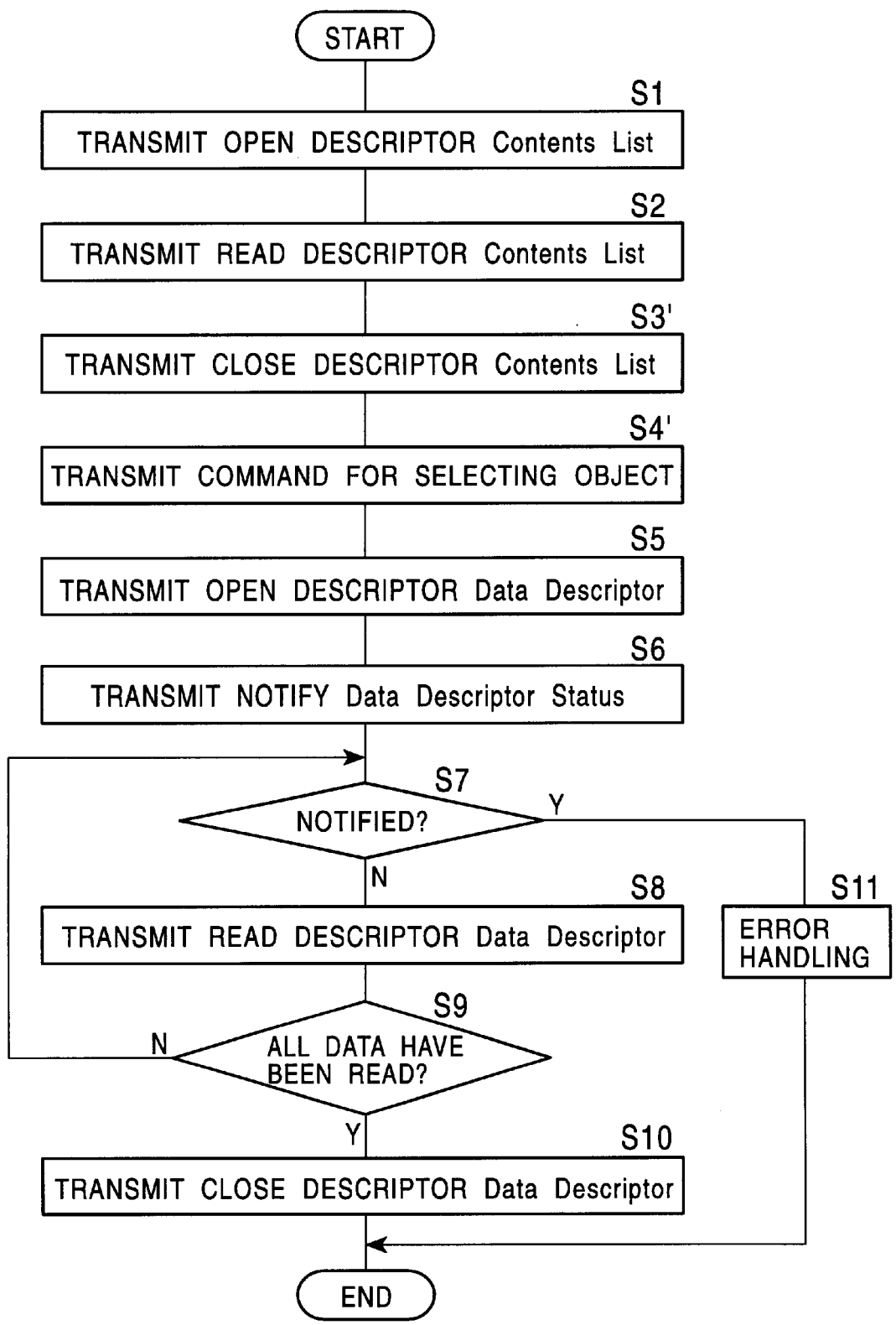
FIG. 9 is a flowchart showing a process when only the data descriptor of an entry selected by the source apparatus is created.

In the process of FIG. 9, the first two steps are the same as those of FIG. 7. In the third step S3', the receiver apparatus 2 transmits to the source apparatus 1 a command (CLOSE DESCRIPTOR Contents List) for closing the contents list.

Next, the receiver apparatus 2 transmits a command for selecting an object (entry in the contents list 41) to the source apparatus 1 (step S4'). Upon receiving this command, the source apparatus 1 creates a data descriptor as a child list of the selected entry. The process of the receiver apparatus 2 of this step and subsequent steps is the same as the process described in FIG. 7.

The description up to this point is one in which a data descriptor is created in the memory 13 inside the source apparatus 1. Next, a description will be given of a case in which a data descriptor is created in the memory 23 inside the receiver apparatus 2.

Figure 10:
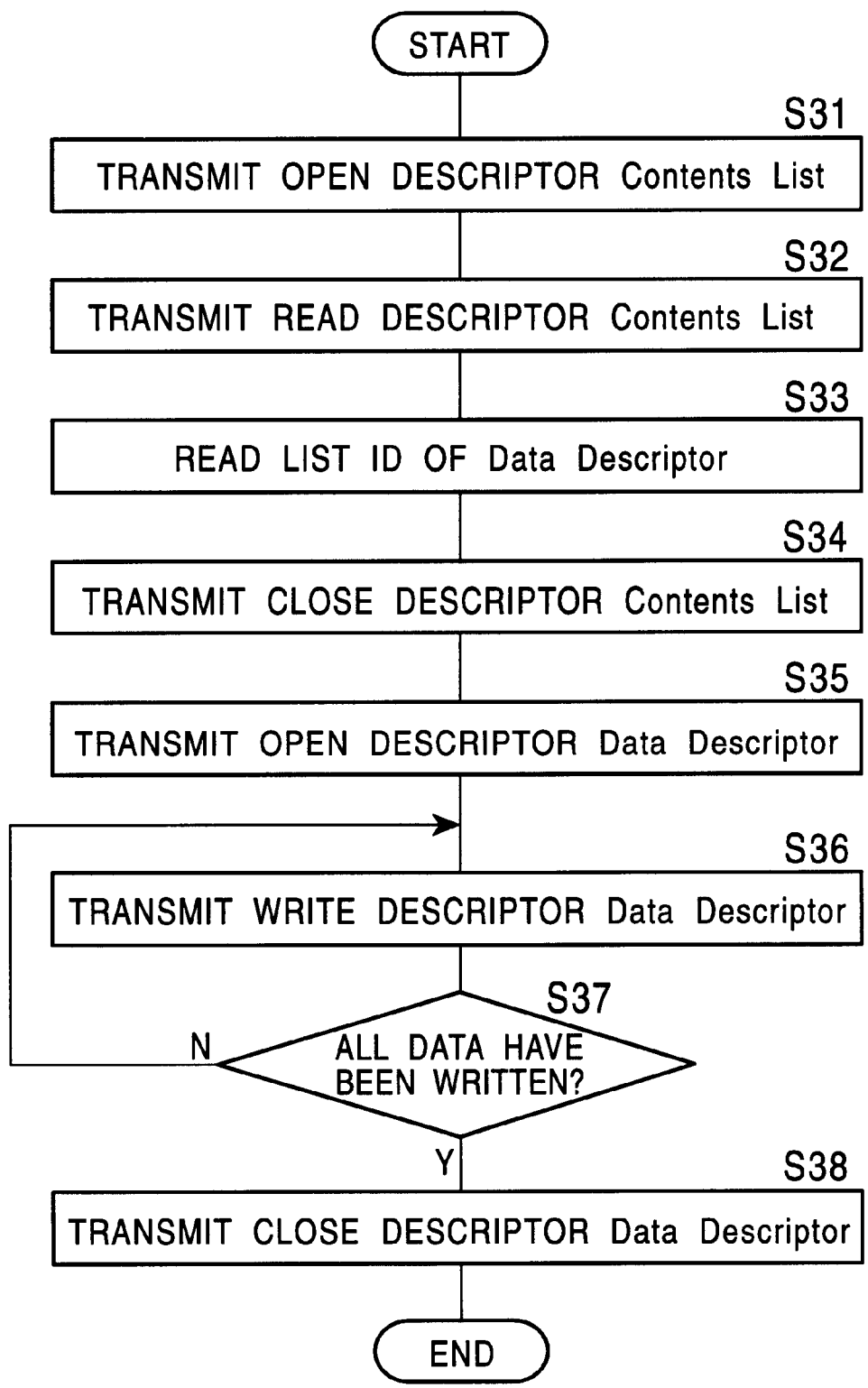
FIG. 10 is a flowchart showing a process of the source apparatus when the data descriptors of all the entries are created inside the receiver apparatus.

FIG. 10 is a flowchart showing the process of the source apparatus 1 when the data descriptors of all the entries of the contents list are created within the memory 23.

Initially, the source apparatus 1 transmits to the receiver apparatus 2 a command (OPEN DESCRIPTOR Contents List) for opening the contents list within the memory 23 (step S31).

Then, the source apparatus 1 transmits to the receiver apparatus 2 a command (READ DESCRIPTOR Contents List) for reading the contents list within the memory 23 (step S32).

Next, the source apparatus 1 reads the list ID of the data descriptor from the entries of the contents list stored in the response for the contents list read command (step S33), and then transmits a command (CLOSE DESCRIPTOR Contents List) for closing the contents list (step S34).

Next, the source apparatus 1 transmits to the receiver apparatus 2 a command (OPEN DESCRIPTOR Data Descriptor) for opening the data descriptor (step S35). In this command, the list ID of the data descriptor in which still image data is to be written is stored beforehand.

Next, the source apparatus 1 transmits to the receiver apparatus 2 a command (WRITE DESCRIPTOR Data Descriptor) for writing the still image data of the data source block 11 of itself into the data descriptor (step S36).

Then, when the writing of all the still image data into the data descriptor inside the receiver apparatus 2 is completed (YES in step S37), the source apparatus 1 transmits a command (CLOSE DESCRIPTOR Data Descriptor) for closing the data descriptor to the receiver apparatus 2 (step S38), and the process is terminated.

If, in the receiver apparatus 2, the operation of writing into the memory 23 (writing into the data descriptor) does not keep pace, a reject (REJECT) response is returned with respect to the data descriptor write command.

Figure 11:
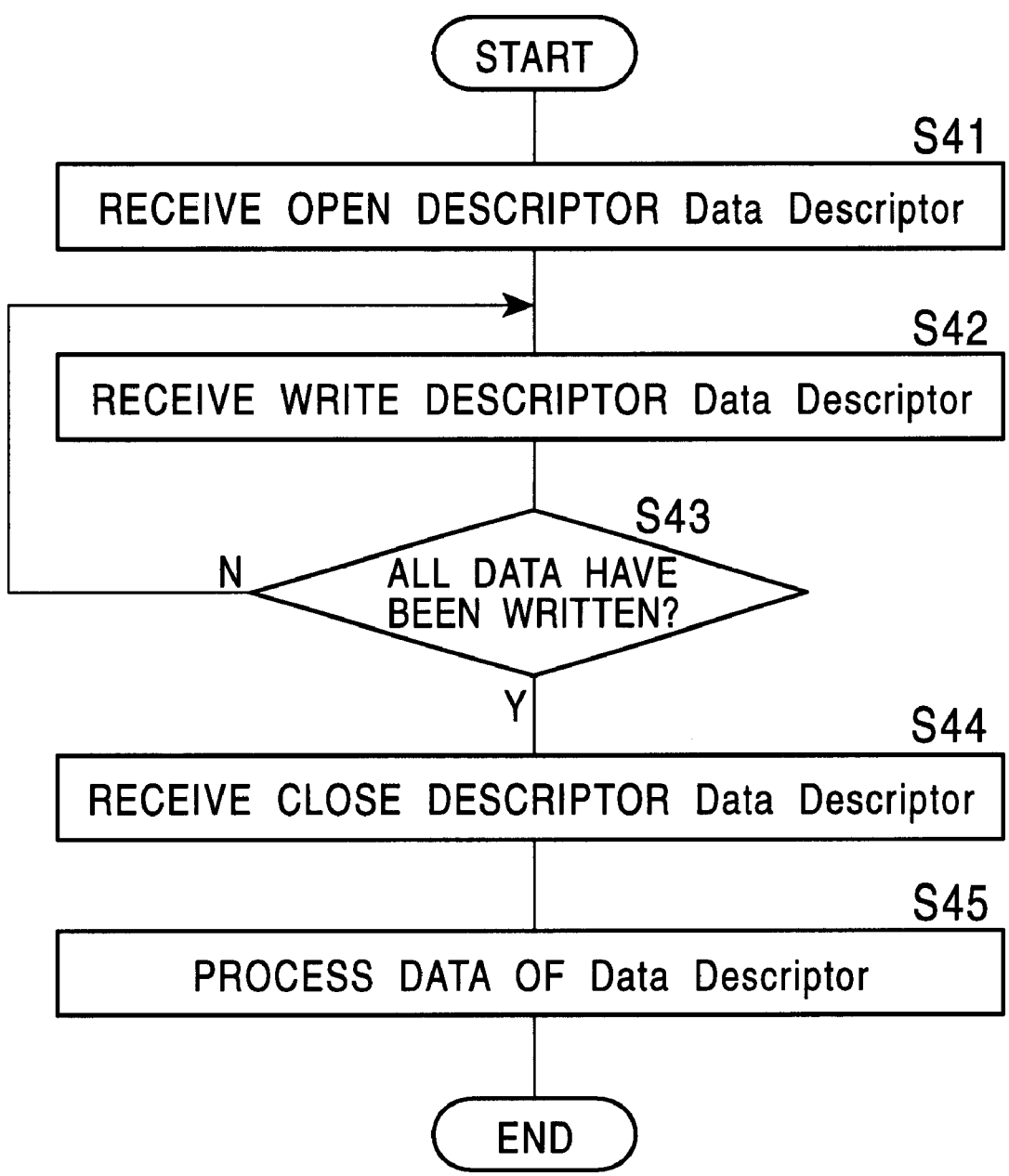
FIG. 11 is a flowchart showing a process when the data descriptor of a preselected entry is created inside the receiver apparatus.

FIG. 11 is a flowchart showing the process of the receiver apparatus 2 when a single content selected from the data source block 11 is written into the single data descriptor inside the receiver apparatus.

Initially, the receiver apparatus 2 receives from the source apparatus 1 a command (OPEN DESCRIPTOR Data Descriptor) for opening the data descriptor within the memory 23 (step S41). The source apparatus 1 may then access the data descriptor within the memory 23.

Next, the receiver apparatus 2 receives from the source apparatus 1 a command (WRITE DESCRIPTOR Data Descriptor) for writing data into the data descriptor within the memory 23 (step S42). Then, the process of step S42 is repeated until the writing of all the data is completed (step S43).

When the writing of all the data is completed, the receiver apparatus 2 receives from the source apparatus 1 a command (CLOSE DESCRIPTOR Data Descriptor) for closing the data descriptor (step S44), and then performs data processing of the data descriptor (step S45). For the processing of the data descriptor, as shown in, for example, FIG. 12, the data written in the data descriptor may be read and a data stream may be created in real time by using the time information within the data. The way in which the data written in the data descriptor is processed is managed by the receiver apparatus 2.

In the system described with reference to FIGS. 10 to 12, if the processing speed of the receiver apparatus 2 is in time, application to transmission of dynamic data, such as audio data, having a low rate of about 20 kbps, is also possible.

As has been described above in detail, according to the present invention, it is possible to transmit data having a small amount of data, such as static data or low-rate audio data, by using Async packets.

Furthermore, since such data is transmitted using Async packets, the format of a conventional data descriptor and command/response needs only be expanded, and therefore, there is no need to develop or implement a new protocol.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An apparatus for use in a system which performs communications among a plurality of electronic apparatuses connected by a bus capable of performing isochronous and asynchronous communications, comprising:

a memory having formed therein a contents list containing a list of specific information that is available and arranged into a plurality of data descriptors, wherein each of said plurality of data descriptors has written therein data of a still image for asynchronous communications, and means for transmitting the data read from a selected one of said plurality of data descriptors in asynchronous communication.

2. The apparatus according to claim 1, wherein data of a plurality of contents which can be selected from a data source are respectively written into said plurality of data descriptors.

3. An electronic apparatus according to claim 1, wherein said electronic apparatus is formed as an apparatus on the data transmission side.

4. An electronic apparatus according to claim 1, wherein said electronic apparatus is formed as an apparatus on the data receiving side.

5. The apparatus according to any one of claims 1, 2, 3, or 4, wherein said bus complies with an IEEE1394 serial bus standard.

6. A data communication method which performs communications among a plurality of electronic apparatuses connected by a bus capable of performing isochronous and asynchronous communications, said data communication method comprising the steps of:

writing data of an object selected from a data source inside an electronic apparatus on a transmission side into a memory having formed therein a contents list containing a list of specific information that is available and arranged into a plurality of data descriptors, wherein each of said plurality of data descriptors has written therein data of a specific object; and transmitting the data read from a selected one of said plurality of data descriptors in asynchronous communication.

7. The data communication method according to claim 6, further comprising the steps of:

reading, after the data of specific information can be selected from said data source are written into said selected one of said plurality of data descriptors, the data of the contents selected by the electronic apparatus on a receiving side from said selected one of said plurality of data descriptors; and transmitting said data.

8. The data communication method according to claim 6, further comprising the steps of:

writing, by said electronic apparatus on the transmission side, the data of the specific information selected by said electronic apparatus on the receiving side into said selected one of said plurality of data descriptors; and reading and transmitting said data.

9. A data communication method according to claim 6, wherein, when data written into said data descriptor varies while said data is being transmitted, this change is notified to the electronic apparatus on the receiving side.

10. A data communication method which performs communications among a plurality of electronic apparatuses that are connected by a bus capable of performing isochronous and asynchronous communications, said data communication method comprising the step of:

transmitting in asynchronous communication data of contents selected from a data source inside an electronic apparatus on a transmission side into a data descriptor formed as part of a contents list in a memory inside an electronic apparatus on a receiving side.

11. The data communication method according to claim 10, further comprising the step of transmitting, by said electronic apparatus on the transmission side, a plurality of data selected from the data source and stored as descriptors in a contents list of a memory inside the electronic apparatus on the transmission side.

12. A data communication method according to claim 10, wherein said electronic apparatus on the transmission side transmits one data which is selected from the data source inside the electronic apparatus.

13. A data communication method according to one of claims 6 to 12, wherein said bus complies with the IEEE1394 serial bus standard.

14. A data communication system for transmitting data in asynchronous communication among a plurality of electronic apparatuses connected by a bus and being capable of performing isochronous and asynchronous communication, said data communication system comprising:

a source apparatus having
a data source for generating data,
a source processor for performing control of the source apparatus,
a source memory having a contents list arranged to have a list of specific information and to have a plurality of data descriptors,
wherein the data generated by the data source is written into the plurality of data descriptors, and
a source interface for
reading the data from a selected data descriptor,
storing the data along with commands and responses created by the source processor, in asynchronous packets, and
sending said asynchronous packets to the bus,
wherein said source interface also extracts information from the asynchronous packets and sends said information to the source processor; and
a receiver apparatus for reading the list of specific information of the contents list by sending a contents list command and for reading the data descriptor by sending descriptor read command to the source apparatus through the bus, said receiver apparatus having
a receiver interface for receiving the asynchronous packets from the bus,
a receiver memory for storing the asynchronous packets received by the receive interface,
a receiver processor for performing control of the receiver apparatus, and
a data receiver for receiving the asynchronous packets stored in the receiver memory,
wherein the receiver apparatus is capable of writing to the data descriptor by sending a descriptor write command to the source apparatus through the bus,
wherein the source processor is capable of writing a status of the data written in the data descriptor to an address of the data descriptor to indicate whether the data is ready to be read, and
wherein the source apparatus notifies the receiver apparatus of a change in the data written into the data descriptor if said data varies while being transmitted.

15. A data communication method for transmitting data in asynchronous communication among a plurality of electronic apparatuses connected by a bus and being capable of performing isochronous and asynchronous communication, said data communication method comprising the steps of:

on a transmission side,
generating said data from a data source;
writing said data into a data descriptor formed in a contents list of a source memory;
reading data from the data descriptor;
storing the data read from the data descriptor in asynchronous packets in a source interface; and
sending said asynchronous packets from the source interface to the bus; and on a receiving side,
receiving the asynchronous packets from the bus;
storing the asynchronous packets to a receiver memory; and
receiving the asynchronous packets stored in the receiver memory.

* * * * *